United States Patent [19]
Kobayashi

[11] Patent Number: 5,963,877
[45] Date of Patent: *Oct. 5, 1999

[54] TELEPHONE CALL RECEIVER INDICATOR

[75] Inventor: Hironori Kobayashi, Newport Beach, Calif.

[73] Assignees: Sony Corporation, Tokyo, Japan; Sony Trans Com, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,206

[22] Filed: Jan. 30, 1997

[51] Int. Cl.$^6$ .............................. H04Q 7/20; H04Q 7/32; H04Q 7/38

[52] U.S. Cl. ........................ 455/567; 455/431; 455/403; 455/550; 455/14

[58] Field of Search ...................................... 455/567, 431, 455/566, 422, 403, 550, 523, 14; 370/316, 318

[56] References Cited

U.S. PATENT DOCUMENTS

| | | | |
|---|---|---|---|
| 3,806,663 | 4/1974 | Peek et al. | 455/550 |
| 4,313,208 | 1/1982 | Kavenik | 455/42 |
| 4,774,514 | 9/1988 | Hildebrandt et al. | 345/8 |
| 4,835,604 | 5/1989 | Kondo et al. | 345/8 |
| 4,982,425 | 1/1991 | Saito et al. | 455/567 |
| 5,408,515 | 4/1995 | Bhagat et al. | 455/431 |
| 5,555,466 | 9/1996 | Scribner et al. | 348/8 |
| 5,568,180 | 10/1996 | Okamoto | 348/7 |
| 5,568,181 | 10/1996 | Greenwood et al. | 348/7 |
| 5,568,484 | 10/1996 | Margis | 455/431 |
| 5,596,647 | 1/1997 | Wakai et al. | 381/77 |
| 5,608,447 | 3/1997 | Farry et al. | 348/7 |
| 5,608,448 | 3/1997 | Smoral et al. | 348/7 |
| 5,612,730 | 3/1997 | Lewis | 348/12 |
| 5,627,891 | 5/1997 | Gallagher et al. | 379/446 |
| 5,729,589 | 3/1998 | Samson | 455/467 |
| 5,734,981 | 3/1998 | Kennedy, III et al. | 455/456 |
| 5,808,661 | 9/1998 | Infiesto et al. | 455/431 |

*Primary Examiner*—Wellington Chin
*Assistant Examiner*—Keith Ferguson
*Attorney, Agent, or Firm*—Blakely, Sokoloff, Taylor & Zafman, LLP

[57] ABSTRACT

Implemented on a vehicle, a communication system used to notify a passenger of an incoming telephone call. The communication system includes a telephony system assigned to one or more passenger(s) of the vehicle. The telephony system includes a passenger control unit ("PCU") and a passenger control handset ("PCH") coupled to the PCH, both having processing capability. Either of these units may process telephone information transferred to the telephony system, and in response of detecting a telephone call command, perform a call notification scheme to indicate to the passenger(s) that an incoming telephone call has arrived.

15 Claims, 7 Drawing Sheets

TELEPHONE CALL RECEIVER INDICATOR

BACKGROUND OF THE INVENTION

1. Field of the Invention

The present invention relates to the field of telecommunications. More particularly, the present invention relates to a communication system installed within a vehicle and a corresponding method for processing telephone information to indicate an incoming telephone call.

2. Description of Art Related to the Invention

Over the last few decades, commercial aircraft has become a necessary mode of travel for personal and business reasons. In order to improve passenger comfort, many commercial airlines now are being implemented with passenger entertainment systems that support on-board telephony and entertainment activities such as video games, pay-per-view movies and the like. Typically, on a commercial aircraft, telephony is supported by conventional telephone hardware which is designed only to support outgoing telephone calls originating from an on-board telephone handset servicing one or more passenger seat(s), traditionally not to receive incoming telephone calls. Thus, commercial aircraft have been designed without any capability of notifying a passenger that an incoming telephone call is being transmitted to his or her designated telephone handset.

In light of the growing use of cellular telephones and pagers, it is evident that many people desire the ability of communicating with others at any moment in time. However, for well-recognized reasons, the use of personal cellular phones during airflight is strictly prohibited.

Clearly, it would be advantageous to create a communication system and method for processing telephone information to notify a passenger that an incoming telephone call has been received. This call notification mechanism, noticeably absent from traditional passenger entertainment systems, would enable a telephony system, situated in close proximity to the passenger seat(s), to produce an audible sound (e.g., call ring) to indicate that an incoming telephone call is being received. The use of audible sound for call notification may be disabled in favor of an alternative call notification scheme. This alternative call notification scheme may be necessary in those instances where the call ring would (i) require a high decibel range in order to be heard over the noise associated with motorized travel or (ii) disturb neighboring passengers who may be sleeping, especially if traveling late at night. Yet another reason to avoid audible sound is that sound notification may cause passenger confusion in determining whether the call rings are emanating from their telephony system.

SUMMARY OF THE INVENTION

Implemented in a vehicle, a communication system and method notifying a passenger of an incoming telephone call. In one embodiment, the communication system includes a telephony system assigned to each passenger of the vehicle. The telephony system includes a passenger control unit ("PCU") and a passenger control handset ("PCH") coupled to the PCU. Either the PCU or the PCH may include a processor to process telephone information, and in response to detecting a telephone call command, to perform a call notification scheme. This call notification scheme may include generating an audible sound, switching to a select audio channel, activating or deactivating reading light or flight attendant call button and the like.

BRIEF DESCRIPTION OF THE DRAWINGS

The features and advantages of the present invention will become apparent from the following detailed description in combination with the figures listed below.

DESCRIPTION OF THE PREFERRED EMBODIMENT

Implemented with a vehicle, the present invention relates to a communication system and a method for processing telephone information to indicate an incoming telephone call. The type of vehicles that may be implemented with this communication system may include aircraft, trains, ferries, buses, automobiles and other modes of transit. For clarity sake, however, the illustrative embodiment of the present invention will be featured in a system implemented within an aircraft. While numerous specific details are set forth herein to describe this embodiment of the invention, these details may not be required to practice the spirit and scope of the present invention.

Certain terms are used herein to describe various circuitry of the distributed network. For example, "telephone information" includes any type of content (text, audio, video, etc.) used to indicate an incoming telephone call. Specifically, telephone information includes audio, data and/or control information including (i) telephone call commands such as a "Ring" command indicating to the PCU that an incoming telephone call is directed to it and (ii) an "On/Off Hook" command indicating whether the caller is on the phone or hung up, respectively. The term "activating" should be broadly construed as altering the current state of a device being activated (e.g., turning on, turning off, reducing power to dim illumination, etc.). A "line-replaceable unit" (LRU) is defined as electronic circuitry contained in a protective module that can be easily replaced through the use of plug-in connectors. There exist several types of LRUs such as a seat electronic unit ("SEU") and a zone bridge unit ("ZBU") discussed below, although such electronic circuitry does not have to be configured as LRUs.

The present application assumes that each passenger is assigned to a passenger seat and has access to a passenger control handset through which the passenger can receive or place a telephone call. It is contemplated, however, that information pertaining to one's seat assignment can be stored within a vehicle in a number of ways. For example, seat assignment information can be downloaded before departure. Additionally, the seat assignment information can be entered, in part or whole, after departure. It is contemplated that there are many other well-known techniques to accurately route and update passenger seat information.

Figure 1:
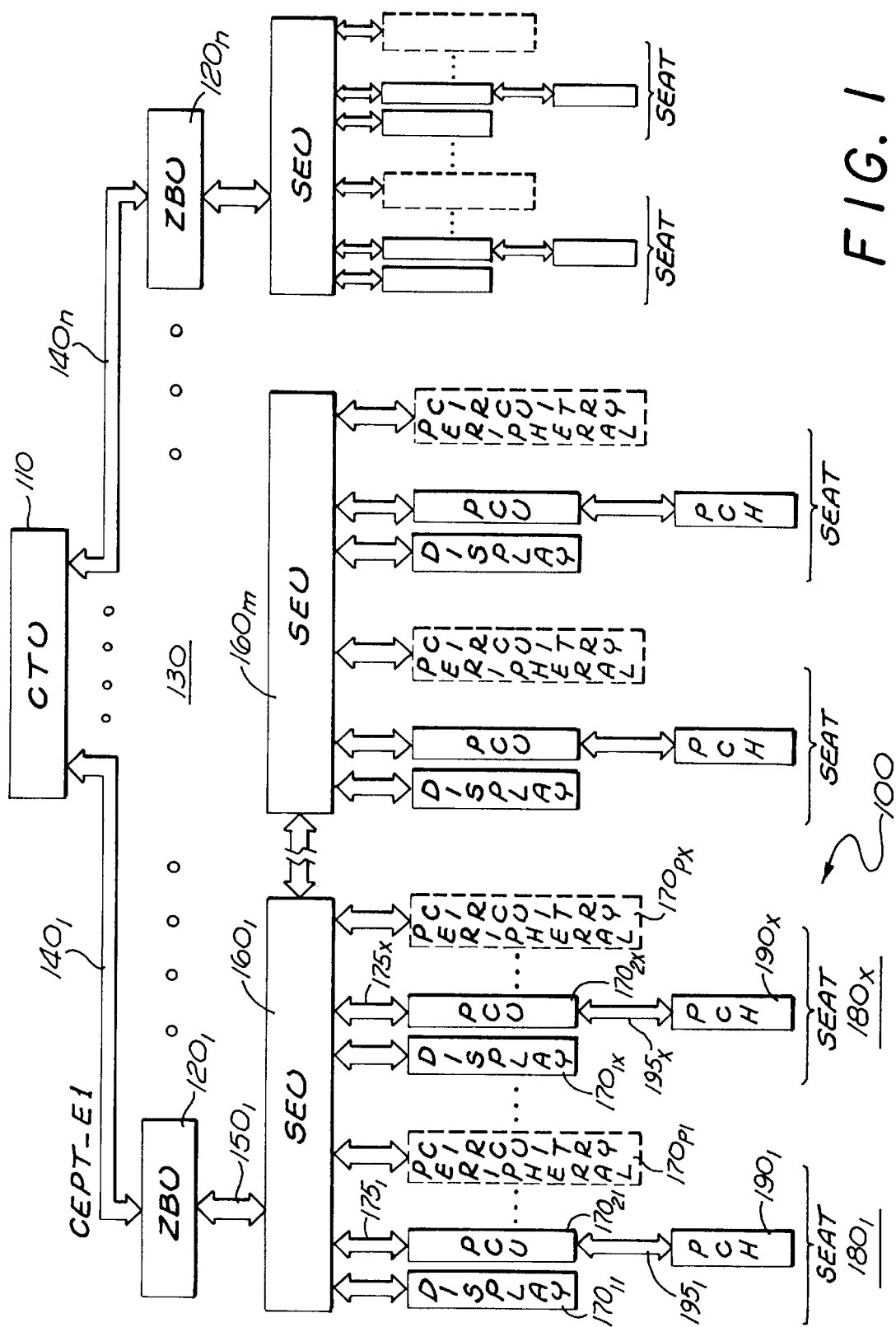
FIG. 1 is an illustrative block diagram of a communication system used to provide telephony capability within a vehicle.

Referring to FIG. 1, an illustrative diagram of one embodiment of a communication system 100 that is used to provide telephony capability throughout a vehicle (e.g., a commercial aircraft) is shown. The communication system 100 includes a cabin telecommunication unit ("CTU") 110. The CTU 110 includes telephone hardware used to establish and maintain audio-based communications with a remotely located telephone. The CTU 110 further handles call processing to support multiple simultaneous telephone calls by multiplexing telephone information to support a well-known "E1" format for Conference of European Postal and Telecommunications ("CEPT-E1"). The CEPT-E1 format supports 30 voice channels at a bit rate of approximately two megabits per second ("Mbps"). It is contemplated that other CEPT formats may be followed. Moreover, it is contemplated that the CTU 110 is configured to generate telephone call commands, represented by a predetermined bit code, in accordance with any communication protocol formed by the original equipment manufacturer ("OEM") of the CTU, OEM of the communication system, manufacturer of the vehicle and the like.

In one embodiment, CTU 110 is coupled to a plurality of zone bridge units ("ZBUs") $120_1$–$120_n$ ("n" is a positive whole number, n>1) through a digital communication bus 130. In this embodiment, the digital communication bus 130 is implemented in a star topology through digital communication lines $140_1$–$140_n$, although other types of network topologies may be used. These digital communication lines $140_1$–$140_n$ provide full-duplex interconnectivity between the CTU 110 and the plurality of ZBUs $120_1$–$120_n$ and enable each ZBU $120_1$ . . . or $120_n$ to asynchronously transfer or receive telephone information.

Each of the digital communication lines $140_1$–$140_n$ includes a differentially driven, twisted wire pair, appropriately shielded by a cable sheath. The use of differentially driven, digital communication lines $140_1$–$140_n$ mitigates adverse affects on telephone information caused by electromagnetic interference or any other noise. However, other types of cabling can be used besides twisted wire pair such as optical fiber.

Figure 2:
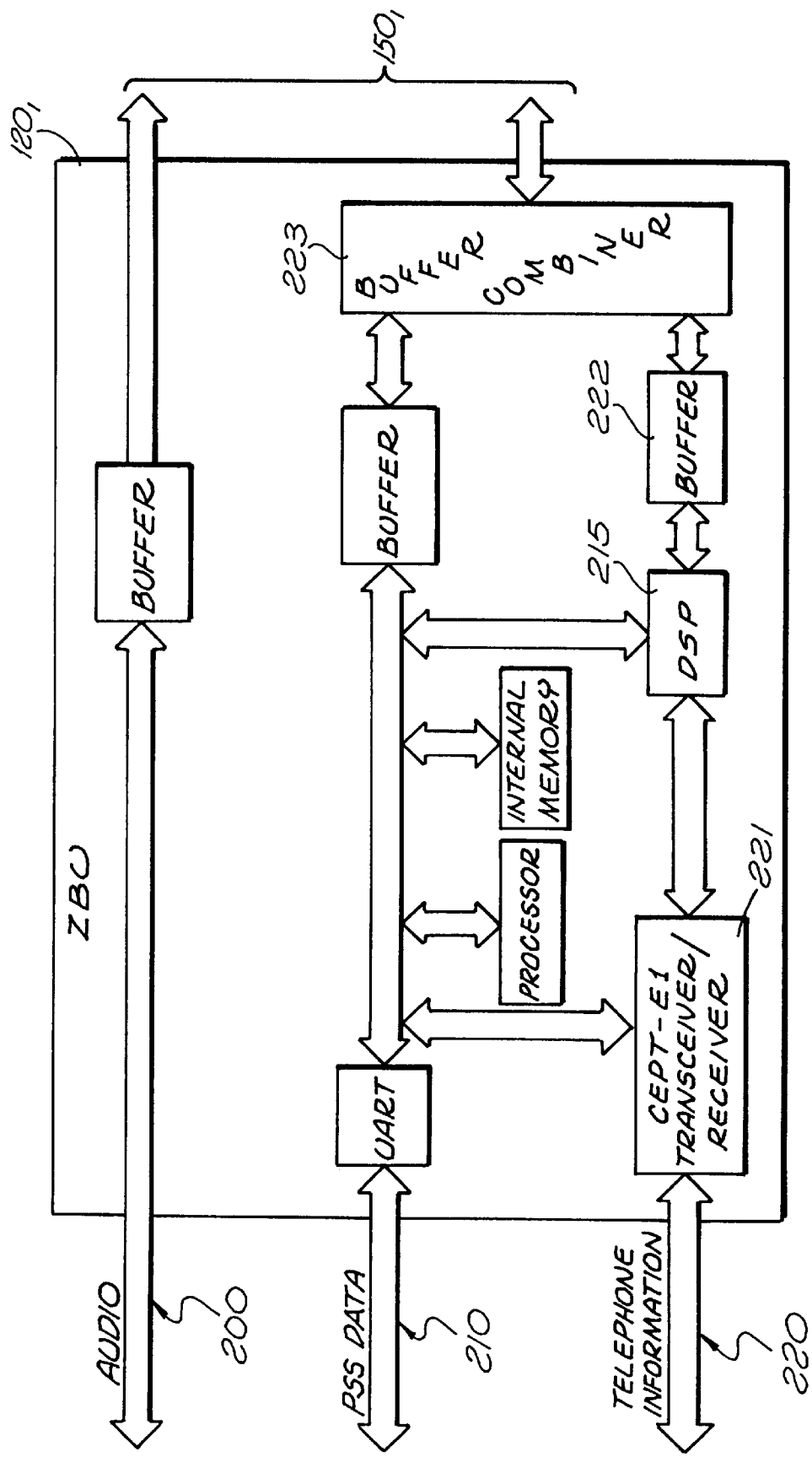
FIG. 2 is an illustrative block diagram of a zone bridge unit ("ZBU") of the communication system of FIG. 1.

Referring to FIGS. 1 and 2, the first ZBU $120_1$ includes multiple input/output ("I/O") ports which are coupled to the digital communication bus 130 and at least a bi-directional digital bus transferring at least passenger service system ("PSS") data, audio and telephone information (referred to as "PAT bus" $150_1$). The other ZBUs $120_2$–$120_n$ are coupled to neighboring ZBUs through digital communication buses as well as other PAT buses. For the first ZBU $120_1$, the PAT bus $150_1$ transfers information between SEUs $160_1$–$160_m$ coupled together in series ("m" being a positive whole number), and their assigned ZBU $120_1$. More specifically, the PAT bus $150_1$ propagates multiplexed audio, PSS data, and telephone information to or from any peripheral device coupled to the SEUs $160_1$–$160_m$ in a chosen protocol and at a data transfer rate of a range of approximately 4–8 Mbps.

Referring now to FIG. 2, one embodiment of a ZBU is shown, although other similar embodiments may be produced by a person skilled in the art. For example, a first ZBU $120_1$ includes at least an audio port 200, a PSS port 210, and a telephone port 220, where digital communication bus $140_1$ is coupled to at least telephone port 220. The telephone port 220 is coupled to a CEPT-E1 transceiver 221 that, possibly using a phase-locked loop technique, converts incoming serial telephone information clocked at a first clock rate to serial telephone information clocked at a second clock rate (e.g., 8 megahertz). The second clock rate is in accordance with the clock provided by the processor. The CEPT transceiver 221 is coupled to propagate this newly clocked telephone information into a digital signal processor ("DSP") 215. The DSP 215 converts the serial telephone information into a parallel format and temporarily stores the telephone information in buffer 222. Buffer 222 temporarily stores the telephone information so it can be combined with the PSS data and contemporary audio upon propagating through a buffer/combiner element 233. The buffer/combiner element 223 functions as a multiplexer for transmissions to an appropriate seat electronics unit ("SEU") through at least the PAT bus $150_1$. In the reverse direction, the element 223 operates as a demultiplexer.

Referring back to FIG. 1, each SEU $160_1$–$160_m$ includes circuitry used to control the propagation of information, including telephone information, between its assigned ZBU and its peripheral devices $170_{11}$–$170_{1x}$, $170_{21}$–$170_{2x}$ . . . , $170_{p1}$–$170_{px}$ ("p" and "x" being positive whole numbers where "p" represents the number of peripheral devices for each "x" sets of peripheral devices supported by its corresponding SEU). Each set of the peripheral devices includes, but is not limited to a display $170_{11}$–$170_{1x}$ (e.g., a flat panel display including a liquid crystal display, an active matrix display or a display worn by the passenger, such as GLASTRON™ by Sony Corporation of Tokyo, Japan), a telephony system including a passenger control unit ("PCU") $170_{21}$–$170_{2x}$, and perhaps other peripheral circuitry $170_{p1}$–$170_{px}$ such as a modem connector (e.g., RJ-11 connector), head phone connector and the like. In this embodiment, each passenger seat $180_1$–$180_x$ is uniquely assigned to one of "x" sets of peripheral devices.

Figure 3:
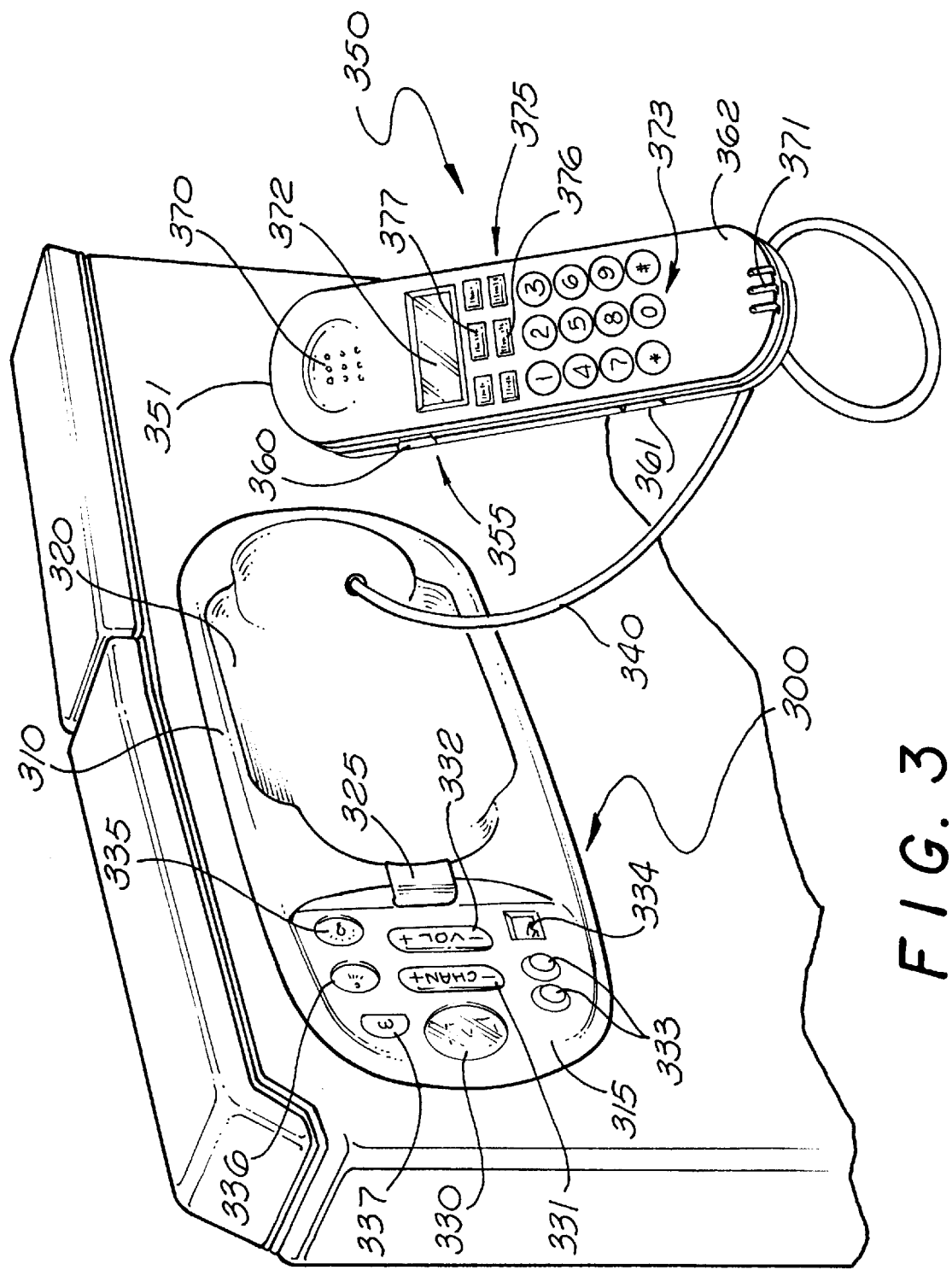
FIG. 3 is an illustrative embodiment of a telephony system including a passenger control unit and a passenger control handset coupled to the passenger control unit.
Figure 5:
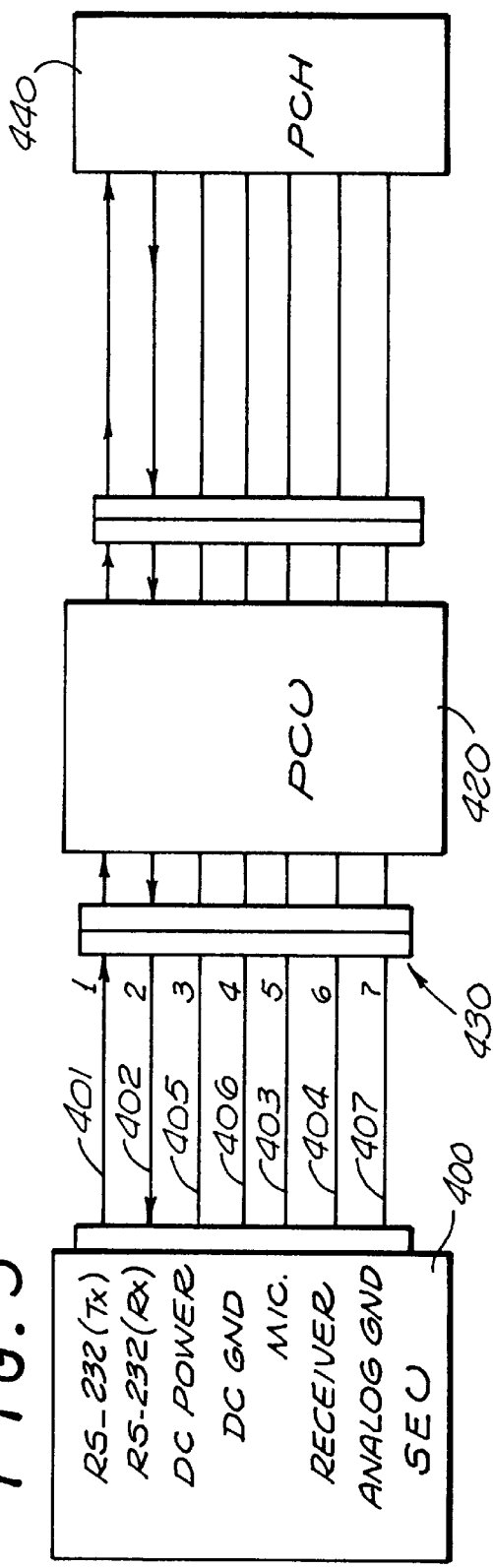
FIG. 5 is a general schematic view of an embodiment of the interconnections between the passenger control unit, passenger control handset and the SEU.

As shown, each PCU $170_{21}$–$170_{2x}$ is coupled to an assigned SEU through a first communication path $175_1$–$175_x$ and a corresponding passenger control handset ("PCH") $190_1$–$190_x$ through a second communication path $195_1$–$195_x$. As shown in FIGS. 1, 3 and 5, each second communication path $195_1$–$195_x$ features a cable having a plurality of signal lines coupled to the PCU $170_{21}$–$170_{2x}$, preferably through a cord reel (not shown) to maintain the cable generally taut.

The peripheral circuitry $170_{p1}$–$170_{px}$ may include one or more connectors such as, for example, a head phone connector and/or a modem connector. The head phone connector provides the passenger audio upon inserting a connector of a headset therein. Similarly, the modem connector allows the passenger to exchange information between a remotely located source and his or her computer. It is contemplated, however, that one or both of these connectors may be implemented within the PCU as shown in FIG. 3.

Referring now to FIG. 3, an illustrative embodiment of the telephony system which may be installed within an armrest of a passenger seat as shown. The telephony system 300 includes an island unit 310 featuring the passenger control unit ("PCU") 315 and a compartment 320 sufficiently sized to store its corresponding passenger control handset ("PCH") 350. In this embodiment, the island unit 310 is designed with length and width dimensions to accommodate the PCU 315 and PCH 350. A locking mechanism 325 is placed proximate to the periphery of the compartment to become engaged with a first edge 351 of the PCH 350 in order to maintain the PCH 350 within the compartment during non-use. The PCH 350 is released from the compartment 320 by firmly depressing the locking mechanism 325. The island unit 310, as shown herein as including the casing of the PCU and compartment, is made of plastic fabricated through an injection molding process such as a polycarbonate, although another type of polymer may be used.

As shown, the PCU 315 includes a light emitting diode ("LED") display 330, a pair of audio control buttons 331 and 332, a dual-input headphone connector 333, a modem connector 334 and a plurality of miscellaneous control buttons 335–337, all of which are supported by a circuit board or flex circuitry encased with the casing of the PCU 315. Some functions provided by a display, connectors or buttons may be used for the call notification mechanism.

For example, the LED display 330 illustrates the in-flight audio channel currently selected by the passenger such as, for example, a channel featuring rock 'n roll music, audio for video movies or other types of audio. In addition, LED display 330 may be used to indicate an incoming telephone call through repetitive flashing of the LED display 330 or automatically setting to a particular audio channel used to alert passengers of the incoming telephone call through playback of an advisory message.

Other call notification schemes may include activating a display associated with the passenger seat assigned to the targeted passenger. The seat display $170_{11}$ may display plain text or symbols indicating an incoming call or altering backlight illumination. Likewise, a dedicated light source may be placed on the PCU 315 or PCH 350, the armrest of the passenger seat, or the seat display. The flashing of the light source would signal an incoming call. Additionally, it is contemplated that a vibrator, such as those used by pagers, may be implemented into the armrest, seat back of the passenger seat or the PCH and activated to signal an incoming call.

The plurality of miscellaneous control buttons 335–337 are configured to perform certain requisite in-flight amenities. For example, a first control button 335 is a switch for activating or deactivating the reading light assigned to the passenger seat, while second and third control buttons 336 and 337 are used as a flight attendant call button and a flight attendant call reset button, respectively. Likewise, these control buttons also may be used as an alternative call notification scheme through repetitive activation/deactivation of the reading light or the activation of the flight attendant call button.

As further shown in FIGS. 3–4, coupled to the PCU 315 through a plastic coated cable 340 protecting a plurality of communication lines as described below, the PCH 350 collectively functions as both a telephone handset and a display control unit for a display. In general, the PCH 350 is constructed so that the first edge 351 is engaged with the locking mechanism 325 when inserted into the compartment 320 as well as second, third and fourth edges. A credit card reader (e.g., a magnetic stripe card reader) 355 may be adapted along the fourth edge of the PCH 350 between its "hot keys" 360 and 361 of the display control unit portion and its handset side discussed below. This allows immediate payment to be made by the passenger for telephone calls and for use of its interactive entertainment activities.

The features for the telephone handset are placed on the handset side 362 of the PCH 350. More specifically, the features include a speaker 370 and microphone 371 to provide voice audio between the passenger and the recipient of the telephone call, a liquid crystal display ("LCD") 372 to display information (e.g., the phone number dialed, the duration of the telephone call, etc.) and a plurality of call input buttons 373 labeled from 0–9 including symbols "#" and "*". In addition, the handset side 362 includes a plurality of handset control buttons 375 including at least an On/Off button 376 and a volume control button 377. Optionally, other control buttons may include a "function" button utilized to alter status of the PCH's memory for speed dialing modifications, a "clear" button for dial correction, a "send" button to transmit the dialed phone number to the SEU and the "end" button to indicate the end of communication.

Figure 4:
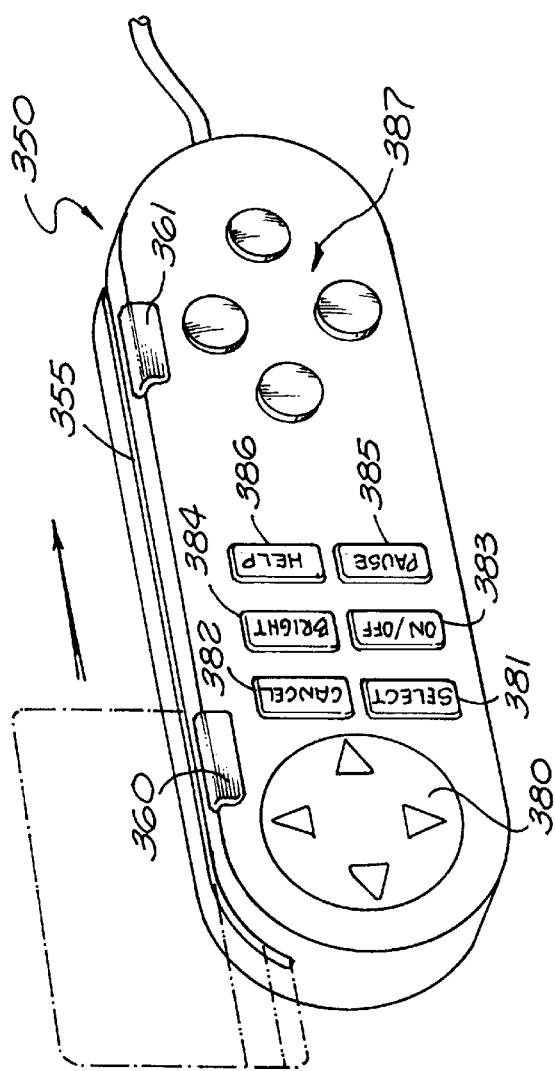
FIG. 4 is a perspective view of a display side of the passenger control handset of FIG. 3.

Referring now exclusively to FIG. 4, the features for the display control unit are placed on a display side of the PCH 350. These features include a direction controller 380, a "select" button 381, a "cancel" button 382, an "On/Off" button 383, a "bright" button 384, a "pause" button 385, a help ("?") button 386, an ABXY button grid 387 and the pair of hot keys 360 and 361. The direction controller 380, select, cancel and pause buttons 381–382 and 385, the ABXY button grid 387 and the pair of hot keys 360–361 are video game controls similar to commercially available video systems such as PLAYSTATION™ by Sony. The help button 386 may be used to signal the display to provide a help menu providing explanations to be read by the passenger while the On/Off and bright buttons 383–384 are used to turn on or off the display corresponding to the passenger seat as well as adjust the brightness of the display.

Referring now to FIG. 5, a general schematic diagram illustrates the communication paths between a SEU 400 (e.g., SEU $170_1$ of FIG. 1) and the PCU 420 (e.g., PCU $170_{21}$ of FIG. 1). The SEU 400 is coupled to the PCU 420 through an interface 430 featuring serial data lines, analog lines, power and ground. The PCU 420 is further routed to the PCH 440 (e.g., PCH $190_1$ of FIG. 1) utilizing the same interface scheme. As shown, an embodiment of the interface 430 supports at least telephony and interactive entertainment activities through the communication lines shown in Table A.

TABLE A

Communication Lines Associated with the Interface

| Comm Line No. | Name | Description |
|---|---|---|
| 1 | RS-232(Tx) | Data Transmit line |
| 2 | R-232(Rx) | Data Receive line |
| 3 | DC Power | Power line |
| 4 | DC Ground | Ground for lines 1–3 |
| 5 | Microphone | Audio Transmit line |
| 6 | Receiver | Audio Receive line |
| 7 | Analog GND | Ground for lines 5 & 6 |

The serial data lines 401–402 are illustrated as a low impedance serial data lines 401–402 in accordance with a well-recognized RS-232 standard (hereinafter referred to as "RS-232(Tx) line 401" and "RS232(Rx) line 402") that serially transfer information from the SEU 400 to the PCU 420 and vice versa, respectively. The information transferred to the PCU 420 may include telephone call commands which are processed by the PCU 420 and/or PCH 440 to cause various I/O circuitry of the PCU 420 and/or PCH 440 to indicate an incoming telephone call is being received by either production of an audible sound or performance of an alternative call notification scheme. The reason that the serial data lines are preferred over parallel data lines is that the length of the communication line that interconnects the PCU 420 to the SEU 400 may be over ten feet in length which warrants serial communication for reliability concerns when cost-effectiveness is an issue. Thus, any voltage drop caused by the impedance in the cable would have no appreciable effect on the RS-232 twelve volt ("V") signals.

It is contemplated that other types of data lines may be used according to other electrical standards and implementation specific requirements.

The analog lines 403–404 are illustrated as a microphone line 403 that transmits audio sound in an analog format originating from the PCH 440 and a receiver line 404 that transfers audio back to the PCH 440. The power line 405 is represented as a DC Power line which provides approximately twelve volts (≈12 V) for use by the PCU 420. The ground lines 406–407 include a DC Ground line 406 and an Analog Ground line 407 which provide a ground reference to circuitry within the PCU 420 and a ground reference for the analog circuitry in the PCH 440, respectively.

As further shown, the PCU 420 is further coupled to the PCH 440 utilizing the same interface scheme so that the PCH 440 can be electrically coupled to the SEU 400 without being mechanically coupled thereto. However, the voltage placed on the power line from the PCU 420 to the PCH 440, corresponding to the DC Power line 405, is regulated or converted to a voltage approximate to a well-recognized voltage level (e.g., approximately 5 V per Transistor-Transistor Logic "TTL" or Emitter Couple Logic "ECL") in those implementations where the PCU 420 and PCH 440 are in close proximity.

Figure 6:
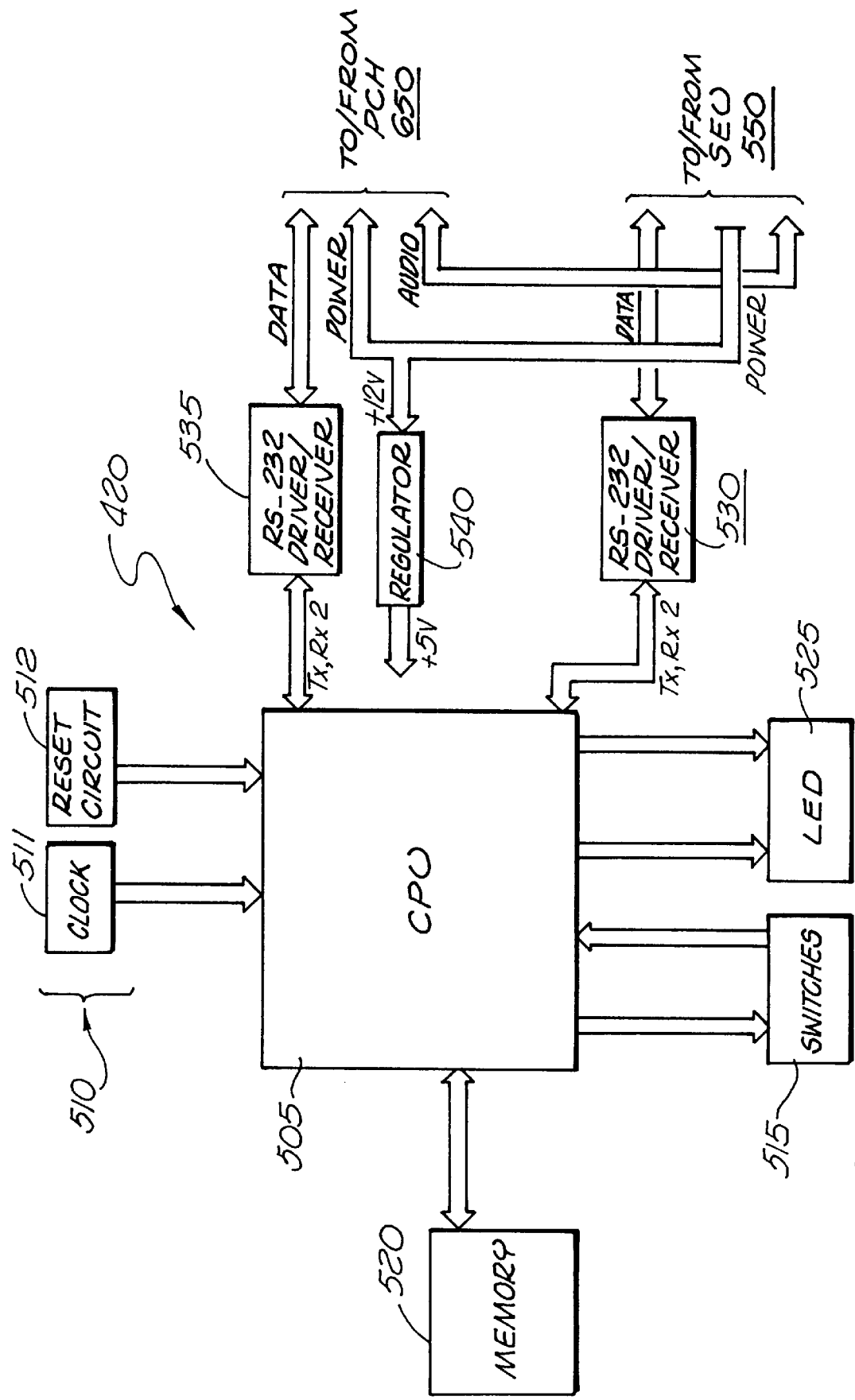
FIG. 6 is an illustrative block diagram of the circuitry of the passenger control unit and its interconnections to both the passenger control handset and the SEU.

Referring to FIG. 6, an illustrative block diagram of the internal circuitry within the PCU 420 is shown. The PCU 420 comprises a central processing unit ("CPU") 505, which controls the general operations of the PCU 420, and control circuitry 510 including but not limited to a reset circuit 512. The CPU 505 is further coupled to I/O circuitry such as a plurality of switches 515, a memory element 520 and a light emitting diode ("LED") display 525. The plurality of switches 515 may be configured so that hardware, independent from the PCU 420, performs various functions upon receiving the Ring command. Performed either concurrently or separately in succession if no response (e.g., answer phone) is detected by the passenger for a predetermined length of time (e.g., a few seconds), these functions may include activating a device generating a call ring signally referred to as a call ring mechanism, setting the LED display to a selected audio channel, activating and/or deactivating a reading light, activating the flight attendant call button, illuminating a dedicated light source, activating a seat display to display information indicative of an incoming call, activating a vibrator or any other device that could be used to indicate receipt of an incoming telephone call. The memory element 520, preferably made of programmable memory (e.g., flash memory), contains information (e.g., software control programs, error code, state information) and provides storage for use by the CPU 505. The LED display 525 is a seven LED segment display that receives information from the CPU 505 to illuminates the appropriate LEDs to display the audio channel number or may be configured to repetitively flash to indicate an incoming telephone call has been detected.

As still shown in FIG. 6, the PCU 420 communicates with the SEU through a first communication path 550 and communicates with the PCH 440 through a second communication path 650. These data transmission through the communication paths 550 and 650 are controlled by a first serial driver/receiver device 530 and a second serial driver/receiver device 535 (e.g., RS-232 serial data drivers if RS232C data lines are used). For audio data transmissions between the SEU and the PCH, the PCU 420 operates as a conduit without subjecting the audio further translation or processing.

However, the DC power provided by the SEU is translated from its initial voltage level (e.g., approximately 12 V normally utilized by RS-232 serial data lines, which is placed on the DC power line of the first communication path 550, into approximately 5 V for use by the circuitry of the PCU 420. The communication line configuration of an embodiment of the first communication path 550 is shown in Table B.

TABLE B

Communication Lines Associated with the First Communication Path

| Line No. | Name | Description |
| --- | --- | --- |
| 1 | RS-232(Tx) | Serial Data transmit from PCU to SEU |
| 2 | DC Power (+12V) | Initial Voltage Reference (≈12V) from SEU to PCU |
| 3 | RS-232(Rx) | Serial Data receive from SEU to PCU |
| 4 | DC GND | Ground |
| 5 | MIC | Audio transmit from PCU fo SEU |
| 6 | Analog GND | Ground |
| 7 | Receiver | Audio Receive from SEU to PCU |
| 8 | Shield | Noise reduction |

Figure 7:
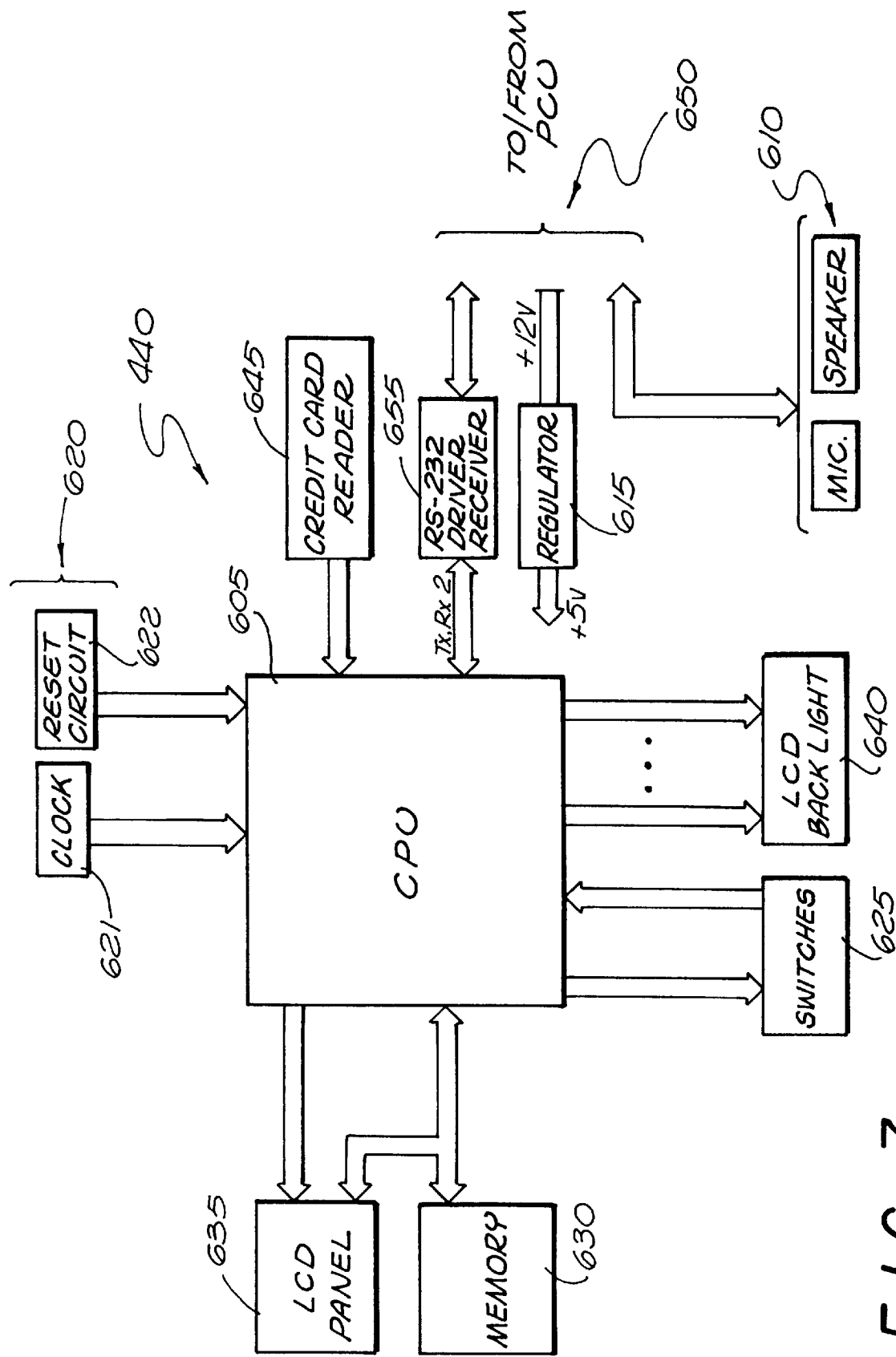
FIG. 7 is an illustrative block diagram of the circuitry of the passenger control handset and its interconnections to the passenger control unit.

Referring to FIG. 7, an illustrative block diagram of internal circuitry of the PCH 440 is shown. The PCH 440 comprises (i) a central processing unit ("CPU") 605, controlling the general operations of the PCH 440, and (ii) a microphone/speaker combination 610 which collectively operates as an input/output ("I/O") device in transferring audio information to or from the PCU through the second communication path 650. The CPU 605 as well as other circuitry within the PCH 440 receive DC power from a power regulator 615 which receives DC power from the second communication path 650 and regulates voltage on a DC power line to provide approximately five volts (≈5 V) to the circuitry of the PCH 440.

The CPU 605 is coupled to control circuitry 620 including but not limited to an internal clock 621 and a reset circuit 623. The control circuitry 620 is used to controls the general functionality of the CPU 605. More specifically, the internal clock 621 provides a clock signal (e.g., 16 megahertz "MHz") to the CPU 605 to control its speed of operation. The reset circuit 623 is implemented to indicate to the CPU 605 when power supplied to the CPU 605 is sufficient to guarantee its correct operation.

As shown, the CPU 605 is further coupled to a number of input and/or output devices such as a plurality of switches 625, a memory element 630, a liquid crystal display "LCD" panel 635, a LCD backlight 640 and a credit card reader 645. The plurality of switches 625 are positioned in the PCH 440 to signal to the CPU 605 which call input buttons or handset control buttons (See FIG. 3) are being depressed. The memory element 630, preferably made of programmable memory (e.g., flash memory), contains information (e.g., software control programs, error code, state information and the like) and provides storage for use by the CPU 605. The LCD panel 635 receives information from the CPU 605 to control the nature of its display. The LCD backlight 640 is further controlled by the CPU 605 to control the contrast of the LCD panel 635 which can also be used to indicate an incoming telephone call by occasionally increasing and/or decreasing the illumination intensity of the backlight. The credit card reader 645 is an input device that transfers digital data obtained a credit card (e.g., a Smartcard™, magnetic stripe credit card and the like) inserted or swiped through the credit card reader 645. Preferably, the CPU 605 transfers that information for the SEU which may perform credit card authorization before allowing the passenger to utilize the telephonic features of the handset or other services requiring payment.

As further shown, the PCH 440 communicates with the PCU through the second communication path 650 controlled by a serial driver/receiver device 655, namely a RS-232 driver/receiver device, provided RS-232 serial data lines are used. The serial driver/receiver device 655 receives the digital data provided by the CPU 605 and serially transmits that data through a first communication line of the second communication path 650. Concurrently, audio received by the microphone is transmitted through another communication line. The communication line configuration of an embodiment of the second communication path 650 is shown in Table C.

TABLE C

Communication Lines Associated with the Second Communication Path

| Line No. | Name | Description |
|---|---|---|
| 1 | RS-232(Tx) | Serial Data transmit from PCH to PCU |
| 2 | DC Power (12V) | Voltage reference from PCU to PCH. |
| 3 | RS-232(Rx) | Serial Data receive from PCU to PCH |
| 4 | DC GND | Ground |
| 5 | MIC | Audio transmit from PCH to PCU |
| 6 | Analog GND | Ground |
| 7 | Receiver | Audio Receive from PCU to PCH |
| 8 | Shield | Noise Reduction |

Figure 8:
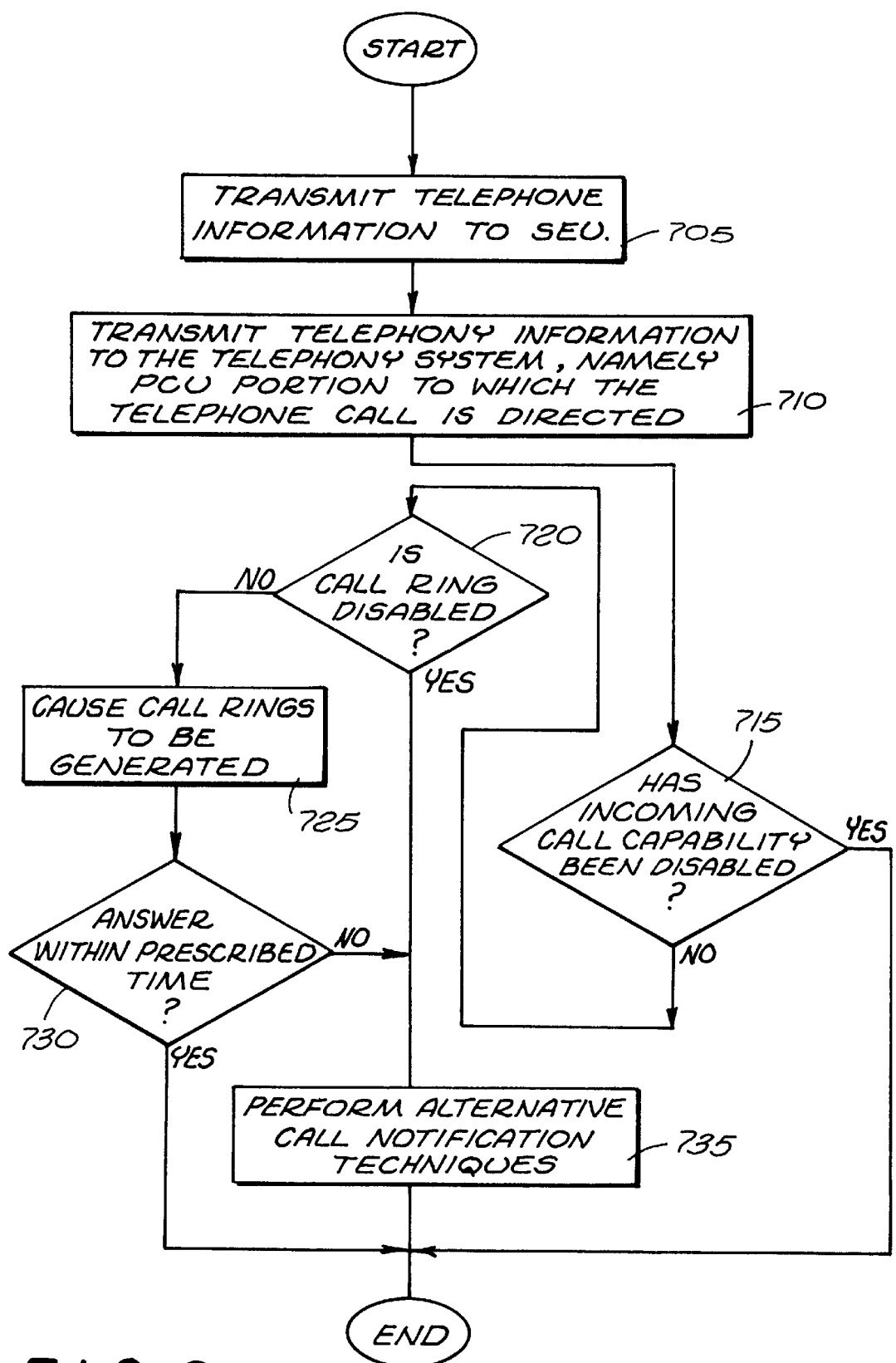
FIG. 8 is a flowchart illustrating the operations of the telephony system to indicate the presence of an incoming telephone call.

Referring now to FIG. 8, a flowchart illustrating the operational steps performed by the telephony system to indicate an incoming telephone call is shown. First, the SEU receives the telephone information, including the telephone call commands, and outputs the telephone information on data lines to the telephony system, namely the PCU, indicating that an incoming telephone call is directed to the PCH (blocks 705 and 710). Next, a determination is made as to whether the incoming call has been disabled by either the passenger or perhaps attendants of the vehicle (block 715). If so, the incoming call may be routed to voice mail system, disconnected after playing a message indicating that the intended recipient has disabled phone service and the like. The response would depend on the type of telephone equipment implemented into the vehicle. If the incoming call has not been disabled, the command is routed to the PCU which determines whether the call ring has been disabled in its entirety, in favor of an alternative call notification scheme (block 720). If not, the command is either transmitted to the PCH to produce the call ring or the call ring is produced by the PCU through activation of one of its switches (block 725).

In the event that the incoming telephone call goes undetected by the intended passenger, or the call ring has been disabled for a prescribed period of time (e.g., more than ten seconds), one or more alternative call notification schemes may be used (blocks 730 and 735). These alternative call notification schemes may be performed subsequently or collectively for a short duration in an effort to notify the passenger of the incoming telephone call. For example, receipt of the telephone call command may cause the CPU of the PCU to control the LED display to show a pre-selected number or repetitively flash the pre-selected number. Another alternative technique is to repetitively activate and deactivate switches in order to provide a repetitious sensory notice such as activating/deactivating the reading light and the like. Yet another alternative technique is to activate the attendant call button causing the attendant to locate or notify the passenger of the incoming telephone call. Another technique is for the PCU to generate a message to be routed to the seat display to provide a message indicating the presence of an incoming call. A further technique is to route control signals to other periphery devices (e.g., vibrator in seat or armrest like those used by pagers) to signal the presence of an incoming call. Another technique would be to cause various occurrences at the PCH level such as varying intensity of the backlight, vibration and the like.

The present invention described herein may be designed in many different embodiments and using many different configurations. As discussed herein, the system architecture of the present invention is flexible enough so that a variety of call notification schemes may be used, separately or concurrently. It is contemplated that each passenger must be assigned a particular seat on the vehicle and the seat location must be known by the communication system during travel. This may be accomplished by entering passenger's name and his or her corresponding seat into a computer which can load such information into the ZBUs. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for alerting a passenger of a vehicle of an incoming telephone call, the method comprising:

receiving the incoming telephone call;

transferring to a seat electronics unit telephone information associated with the incoming telephone call and a predetermined voltage substantially larger than used by the seat electronics unit regulating the predetermined voltage by a regulator at the seat electronics unit to control a flow of telephone information for multiple passengers;

transferring the predetermined voltage and the telephone information intended for the passenger from the seat electronics unit to a passenger control unit proximate to a passenger seat occupied by the passenger, the passenger control unit including a processor, a memory and a regulator;

regulating the predetermined voltage by the regulator to provide a selected level of power to the processor;

processing the telephone information to determine whether the telephone information includes a telephone call command indicating that the incoming telephone call is being directed to the passenger control unit; and performing a call notification scheme to notify the passenger of the incoming telephone call.

2. The method of claim 1, wherein the performing of the call notification scheme includes activating a ringing device by the passenger control unit to generate audible sound to alert the passenger of the incoming telephone call.

3. The method of claim 1, wherein the performing of the call notification scheme includes signaling the passenger control unit to activate or deactivate an overhead reading light corresponding to the passenger seat.

4. The method of claim 1, wherein the performing of the call notification scheme includes signaling the passenger control unit to activate an attendant call button associated with the passenger seat.

5. The method to claim 1, wherein the performing of the call notification scheme by the passenger control unit includes:

signaling the passenger control unit to activate a display associated with the passenger seat to show a visible message, the display being remotely located from the passenger control unit.

6. The method of claim 1, wherein the performing of the call notification scheme by the passenger control unit includes:

signaling the passenger control unit to activate a vibrator in the passenger seat to vibrate.

7. A communication system adapted for use in a vehicle, the communication system comprising:

circuitry for receiving an incoming telephone call and transferring telephone information and audio;

a plurality of communication lines coupled to the circuitry, the plurality of communication lines including a power line to provide a predetermined voltage, a ground line to provide a ground reference and a plurality of digital data lines to provide the telephone information from the circuitry and a passenger control unit coupled to the plurality of communication lines, the processor control unit includes a processor to receive and process the telephone information to determine whether the telephone information includes a telephone call command and to perform a call notification scheme to alert a passenger of the incoming telephone call if the telephone information includes the telephone call command, the processor control unit also includes a voltage regulator to regulate the predetermined voltage in order to produce a lesser voltage used by the processor of the passenger control unit.

8. The communication system of claim 7, wherein the plurality of communication lines further includes a first line to transfer incoming audio and a second line to transfer incoming audio.

9. The communication system of claim 7, wherein the passenger control unit further includes a memory element coupled to the processor and a plurality of switches coupled to the processor, a serial driver coupled to the processor, the serial driver to support the transmission of the telephone information between the circuitry and the passenger control unit.

10. The communication system of claim 9, wherein the passenger control unit further includes a serial driver coupled to the processor, the serial driver to support the transmission of the telephone information between the circuitry and the passenger control unit.

11. The communication system of claim 9, wherein one of the plurality of switches of the passenger control unit is coupled to a flight attendant call button associated with the passenger seat occupied by the passenger.

12. The communication system of claim 9, wherein one of the plurality of switches of the passenger control unit is coupled to a dedicated light source remotely located from the passenger control unit.

13. The communication system of claim 9, wherein one of the plurality of switches of the passenger control unit is coupled to a seat display remotely located from the passenger control unit.

14. The communication system of claim 9, wherein one of the plurality of switches of the passenger control unit is coupled to a vibrator located in the passenger seat to be occupied by the passenger.

15. The communication system of claim 9 further comprising a passenger control handset coupled to the passenger control unit, the passenger control handset including a processor, a liquid crystal display panel, a credit-card reader, a speaker and a microphone.

* * * * *

UNITED STATES PATENT AND TRADEMARK OFFICE
CERTIFICATE OF CORRECTION

PATENT NO.    :  5,963,877
DATED         :  October 5, 1999
INVENTOR(S)   :  Hironori Kobayashi It is certified that error appears in the above-identified patent and that said Letters Patent is hereby corrected as shown below:

In column 7 at line 64 insert --data to-- between "audio" and "further"

In column 8 at line 1 delete "lines," and insert --lines),--

Signed and Sealed this

Twenty-seventh Day of March, 2001

*Attest:*

NICHOLAS P. GODICI

*Attesting Officer*   *Acting Director of the United States Patent and Trademark Office*